(12) United States Patent
Schulz

(10) Patent No.: US 6,440,207 B1
(45) Date of Patent: *Aug. 27, 2002

(54) METHOD FOR PREPARING ORGANIC PIGMENTS

(75) Inventor: Gregory R. Schulz, Mt. Pleasant, SC (US)

(73) Assignee: Bayer Corporation, Pittsburgh, PA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/518,747

(22) Filed: Mar. 3, 2000

(51) Int. Cl.$^7$ .................. C09B 67/20; C09B 67/00; C09B 67/10
(52) U.S. Cl. ............... 106/412; 106/494; 106/495; 106/496; 106/497; 106/498
(58) Field of Search ............... 106/493, 494, 106/495, 496, 497, 498, 412

(56) References Cited

U.S. PATENT DOCUMENTS

| | | | |
|---|---|---|---|
| 3,157,659 A | 11/1964 | Deuschel et al. | 260/279 |
| 3,256,285 A | 6/1966 | Fuchs et al. | 260/279 |
| 3,257,405 A | 6/1966 | Gerson et al. | 260/279 |
| 3,317,539 A | 5/1967 | Jaffe | 260/279 |
| 4,158,572 A | 6/1979 | Blackburn et al. | 106/288 Q |
| 4,186,029 A | 1/1980 | Aign et al. | 106/308 Q |
| 4,257,951 A | 3/1981 | Matrick | 260/314.5 |
| 4,373,930 A | 2/1983 | Rothwell | 8/527 |
| 4,403,077 A | 9/1983 | Uhrig et al. | 8/30 |
| 4,436,522 A | 3/1984 | Niwa et al. | 8/524 |
| 4,872,916 A | 10/1989 | Latosky | 106/503 |
| 4,927,463 A | 5/1990 | Kloetzer | 106/109 |
| 5,073,585 A | 12/1991 | Neubert | 524/139 |
| 5,175,282 A | 12/1992 | Roth et al. | 540/141 |
| 5,266,622 A | 11/1993 | Mazanek et al. | 524/131 |
| 5,466,482 A | 11/1995 | Johnson | 427/212 |
| 5,472,494 A | 12/1995 | Hetzenegger et al. | 106/493 |
| 5,494,511 A | 2/1996 | Holbrook | 106/401 |
| 5,626,662 A | 5/1997 | Urban | 106/497 |
| 5,770,651 A | 6/1998 | Träubel et al. | 524/591 |
| 5,855,662 A | 1/1999 | Brand et al. | 106/498 |
| 5,913,971 A | 6/1999 | Fujimatsu et al. | 106/31.86 |
| 5,922,122 A | 7/1999 | Takeda et al. | 106/493 |
| 5,935,272 A | 8/1999 | Mahaffey, Jr. et al. | 8/403 |
| 5,935,315 A | 8/1999 | Boström | 106/499 |
| 6,031,024 A | 2/2000 | Uraki et al. | 523/161 |
| 6,056,814 A | 5/2000 | Kato et al. | 106/412 |
| 6,156,116 A | * 12/2000 | Lee et al. | 106/412 |

FOREIGN PATENT DOCUMENTS

| | | |
|---|---|---|
| DE | 2414455 | 10/1975 |
| DE | 19811791 | 9/1999 |
| EP | 732382 | 9/1996 |
| EP | 753552 | 1/1997 |
| EP | 894835 | 2/1999 |
| EP | 909799 | 4/1999 |
| GB | 1502884 | 3/1978 |
| GB | 2090876 | 7/1982 |
| PL | 127761 | 6/1985 |
| WO | 98/13728 | 4/1998 |
| WO | 98/50828 | 11/1998 |
| WO | 00/37542 | 6/1999 |
| WO | 99/38920 | 8/1999 |
| WO | 99/49963 | 10/1999 |
| WO | 00/37168 | 6/2000 |

OTHER PUBLICATIONS

W. Carr, "Improving the Physical Properties of Pigments" in Pigment Handbook, vol. III, (New York: John Wiley & Sons, Inc.) (month unavailable) 1973, pp. 29–35, Improving the Physical Properties of Pigments.

W. Herbst and K. Hunger, Industrial Organic Pigments (New York: VCH Publishers, Inc.), (month unavailable) 1993, p. 9, 205–207 and 467–475.

R.B. McKay, "Control of the application performance of classical organic pigments" in JOCCA, (month unavailable) 1989, pp. 89–93.

M.A. Perkins, "Pyridines and Pyridones" in The Chemistry of Synthetic Dyes and Pigments, ed. H.A. Lubs (Malabar, Florida: Robert E. Krieger Publishing Company) (month unavailable) 1955, pp. 481–482.

H. Zollinger, Color Chemistry (VCH Verlagsgessellschaft), (month unavailable) 1991, pp. 227–228 and 297–298.

R.B. McKay, "The Development of Organic Pigments with Particular Reference to Physical Form And Consequent Behaviour in Use" in Rev. Prog. Coloration, vol. 10, (month available) 1979, pp. 25–32.

* cited by examiner

Primary Examiner—Anthony J. Green
(74) Attorney, Agent, or Firm—Joseph C. Gil; Thomas W. Roy

(57) ABSTRACT

This invention relates to a process for preparing dispersible organic pigments by
 (a) milling a mixture containing
  (1) one or more organic pigments,
  (2) at least about 1% by weight, relative to the organic pigment, of one or more aromatic polyalkylene oxide dispersants,
  (3) 0 to about 10 parts by weight, relative to the organic pigment, of a milling liquid in which the organic pigment is substantially insoluble,
  (4) 0 to about 50% by weight, relative to the organic pigment, of one or more milling additives other than dispersant (2), and
  (5) 0 to about 20% by weight, relative to the organic pigment, of one or more surface treatment additives;
 (b) optionally, adding to the milled pigment
  (6) one or more liquids in which the organic pigment is substantially insoluble in amounts such that the total solids content is not reduced below about 10%, and
  (7) one or more multivalent metal salts and/or one or more quaternary ammonium salt; and
 (c) isolating the milled organic pigment

10 Claims, No Drawings

METHOD FOR PREPARING ORGANIC PIGMENTS

BACKGROUND OF THE INVENTION

The present invention relates to processes of preparing readily dispersible organic pigments by milling such pigments in the presence of aromatic polyalkylene oxide dispersants.

Crude organic pigments as obtained after chemical synthesis are generally unsuitable for use as pigments in coating formulations. Therefore, crude organic pigments undergo one or more finishing steps that modify particle size, particle shape, surface characteristics, and/or crystal structure of the pigment in such a way that provides a pigment having good pigmentary quality. See, for example, W. Carr, "Improving the Physical Properties of Pigments" in *Pigment Handbook*, Vol. III (New York: John Wiley & Sons, Inc., 1973), pages 29–35; W. Herbst and K. Hunger, *Industrial Organic Pigments* (New York: VCH Publishers, Inc., 1993), pages 205–207; R. B. McKay, "The Development of Organic Pigments with Particular Reference to Physical Form and Consequent Behavior in Use" in *Rev. Prog. Coloration*, 10, 25–32 (1979); and R. B. McKay, "Control of the application performance of classical organic pigments" in *JOCCA*, 89–93 (1989) herein incorporated by reference. In some finishing processes, one or more of the finishing steps can include a strong mineral acid, followed by precipitation of the pigment, and/or milling the crude pigment. A pigment conditioning process that avoids a strong acid step would be desirable because elimination of such a step would significantly reduce environmental and health risks associated with caustic chemicals and lower costs associated with pigment conditioning processes. Crude organic pigments having undergone a pigment conditioning process are called conditioned organic pigments and are typically sold commercially.

Various dispersants have been used to disperse and maintain, in a dispersed state, conditioned organic pigments in coating systems. Included among the known dispersants for this use are polyalkylene oxide-based compounds such as those described in U.S. Pat. Nos. 4,186,029, 4,373,930, 4,403,077, 4,436,522, 4,872,916, 4,927,463, 5,073,585, 5,266,622, 5,466,482, 5,494,511, 5,855,662, 5,935,272, 5,922,122, and 5,935,315, British Patent 2,090,876, German Offenlegungsschriften 2,414,455 and 19,811,791, Polish Patent 127,761, and PCT Application WO 99/49963. The resultant pigment dispersions or pastes can be combined with other components (such as resins and other additives) to form paints and other coatings. However, such dispersants have not been described as being used for milling crude organic pigments that are isolated as dry powders before being used in paints or other coatings.

U.S. Pat. No. 5,466,482 discloses the use of certain phosphate ester dispersants for surface treatment of organic pigments that, after isolation, are readily dispersible even in the absence of additional dispersant. This patent, however, does not disclose the use of such dispersants during milling or other conditioning processes.

U.S. Pat. No. 5,472,494 discloses pigment preparations containing organic pigments, certain perylene sulfonate or carboxylate derivatives, and optional additives, including dispersants, that can be mixed before, during, or after pigment conditioning. Aromatic polyalkylene oxide dispersants are not disclosed.

PCT Application WO 99/38920 discloses pigment compositions containing an isoindoline pigment, certain alkylenedicarboxylic acid dialkyl esters, and, optionally, fatty acid esters of polyhydroxyalkanes that can have one or more ether groups. Aromatic polyalkylene oxide dispersants are not disclosed.

U.S. Pat. No. 5,626,662 discloses a two-step milling method for preparing finely divided organic pigments by first dry milling coarsely crystalline pigments and then wet milling the resultant finely divided prepigments in aqueous suspension in a stirred ball mill at a power density of more than 2.5 kW per liter and a peripheral stirrer speed of more than 12 m/s using a grinding medium of no more than 1 mm. Milling auxiliaries, including surfactants, can be added in quantities of up to 10% by weight relative to the crude pigment during either milling step. The resultant milled pigment is collected by filtration and the resultant filtercake is then washed and dried. Both milling steps must be carried out to achieve desirable pigment properties.

It has now been found that pigments obtained according to the present invention after milling in the presence of aromatic polyalkylene oxide dispersants, unlike pigments dispersed in a conventional manner, are stir-in pigments that are readily dispersible in aqueous media and do not settle out upon standing. As a result, pigments prepared according to the invention are particularly suitable for use in water-based coating systems, such as coating compositions, paints, and printing inks.

SUMMARY OF THE INVENTION

The present invention relates to a process for preparing dispersible organic pigments comprising
(a) milling a mixture comprising
 (1) one or more organic pigments,
 (2) at least about 1% by weight, relative to the organic pigment, of one or more aromatic polyalkylene oxide dispersants,
 (3) 0 to about 10 parts by weight, relative to the organic pigment, of a milling liquid in which the organic pigment is substantially insoluble,
 (4) 0 to about 50% by weight, relative to the organic pigment, of one or more milling additives other than dispersant (2), and
 (5) 0 to about 20% by weight, relative to the organic pigment, of one or more surface treatment additives;
(b) optionally, adding to the milled pigment
 (6) one or more liquids in which the organic pigment is substantially insoluble in amounts such that the total solids content is not reduced below about 10%, and
 (7) one or more multivalent metal salts and/or one or more quaternary ammonium salt; and
(c) isolating the milled organic pigment (preferably by methods other than filtration).

DETAILED DESCRIPTION OF THE INVENTION

In the process of the present invention, an organic pigment is milled with one or more aromatic polyalkylene oxide dispersants, an optional milling liquid, and optionally one or more milling additives, followed by isolation. The components of the milling mixture may be added or combined in any order such that preferably (but not necessarily) all are present at the start of the milling. The resultant organic pigments contain readily dispersible individual particles or loosely bound aggregates.

Organic Pigments

Suitable organic pigments for use in the practice of the present invention include perylenes, quinacridones, phthalocyanines, 1,4-diketopyrrolopyrroles, isoindolines, indanthrones, dioxazines (that is, triphenedioxazines), anthrapyrimidines, anthanthrones, flavanthrones, indanthrones, isoindolines, perinones, pyranthrones, thioindigos, 4,4'-diamino-1,1'-dianthraquinonyl, and azo compounds, as well as substituted derivatives thereof. Preferred organic pigments are perylene, quinacridone, phthalocyanine, 1,4-diketopyrrolopyrroles, and isoindoline pigments. Mixtures, including solid solutions, may also be prepared. The organic pigments can be used as crude organic pigments that have not been modified after chemical synthesis or as pigments that have been conditioned or otherwise treated by methods other than the process of the present invention.

Perylene pigments used in the practice of the present invention may be unsubstituted or substituted. Substituted perylenes may be substituted at imide nitrogen atoms for example, and substituents may include an alkyl group of 1 to 10 carbon atoms, an alkoxy group of 1 to 10 carbon atoms and a halogen (such as chlorine) or combinations thereof. Substituted perylenes may contain more than one of any one substituent. The diimides and dianhydrides of perylene-3,4, 9,10-tetracarboxylic acid are preferred. Crude perylenes can be prepared by methods known in the art. Please review, W. Herbst and K. Hunger, *Industrial Organic Pigments* (New York: VCH Publishers, Inc., 1993), pages 9 and 467–475, H. Zollinger, *Color Chemistry* (VCH Verlagsgessellschaft, 1991), pages 227–228 and 297–298, and M. A. Perkins, "Pyridines and Pyridones" in *The Chemistry of Synthetic Dyes and Pigments*, ed. H. A. Lubs (Malabar, Florida: Robert E. Krieger Publishing Company, 1955), pages 481–482, incorporated herein by reference.

Quinacridone pigments, as used herein, include unsubstituted or substituted quinacridones (for example, with one or more alkyl, alkoxy, halogens such as chlorine, or other substituents typical of quinacridone pigments), and are suitable for the practice of the present invention. The quinacridone pigments may be prepared by any of several methods known in the art but are preferably prepared by thermally ring-closing various 2,5-dianilinoterephthalic acid precursors in the presence of polyphosphoric acid. E.g., S. S. Labana and L. L. Labana, "Quinacridones" in *Chemical Review*, 67, 1–18 (1967), and U.S. Pat. Nos. 3,157,659, 3,256,285, 3,257,405, and 3,317,539.

Phthalocyanine pigments, especially metal phthalocyanines may be used in the practice of the present invention. Although copper phthalocyanines are preferred, other metal-containing phthalocyanine pigments, such as those based on zinc, cobalt, iron, nickel, and other such metals, may also be used. Metal-free phthalocyanines are also suitable but are generally less preferred. Phthalocyanine pigments may be unsubstituted or partially substituted, for example, with one or more alkyl (having 1 to 10 carbon atoms), alkoxy (having 1 to 10 carbon atoms), halogens such as chlorine, or other substituents typical of phthalocyanine pigments. Crude phthalocyanines may be prepared by any of several methods known in the art. They are preferably prepared by a reaction of phthalic anhydride, phthalonitrile, or derivatives thereof, with a metal donor, a nitrogen donor (such as urea or the phthalonitrile itself), and an optional catalyst, preferably in an organic solvent. E.g., W. Herbst and K. Hunger, *Industrial Organic Pigments* (New York: VCH Publishers, Inc., 1993), pages 418–427, H. Zollinger, *Color Chemistry* (VCH Verlagsgessellschaft, 1991), pages 101–104, and N. M. Bigelow and M. A. Perkins, "Phthalocyanine Pigments" in *The Chemistry of Synthetic Dyes and Pigments*, ed. H. A. Lubs (Malabar, Florida: Robert E. Krieger Publishing Company, 1955), pages 584–587; see also U.S. Pat. Nos. 4,158,572, 4,257,951, and 5,175,282 and British Patent 1,502,884, incorporated herein by reference.

Suitable starting pigments include organic pigments having large particle sizes that do not exhibit good dispersibility or coloristic properties. The process of the present invention can be used to convert such large-particle pigments to readily dispersible forms. Even when pretreated with conditioning agents (including aromatic polyalkylene oxide dispersants), collected, and milled by conventional methods, such large-particle pigments do not exhibit significantly improved dispersibility. Such pretreated pigments can also be improved by milling in the presence of aromatic polyalkylene oxide dispersants according to the present invention.

Suitable starting pigments also include organic pigments in which the particles, although smaller, are aggregated and thus also do not exhibit optimum dispersibility or coloristic properties. For example, many processes that reduce particle size, such as dry milling (e.g., jet milling, ball milling, and the like), can produce aggregates having poor dispersibility. The process of the present invention can be used to convert such aggregated pigments to readily dispersible forms.

Dispersants

Organic pigments are conditioned by the process of the present invention by adding one or more aromatic polyalkylene oxide dispersants to one or more organic pigments. Polyalkylene oxide dispersants that do not contain aromatic groups (for example, hydroxy-terminated polyethylene oxide such as Carbowax 1000) do not produce readily dispersible pigments.

The term "aromatic polyalkylene oxide dispersant" refers to compounds that promote the dispersion of organic pigments and which are characterized by having one or more aromatic or heteroaromatic moieties attached to one or more polyalkylene oxide chains through carbon, oxygen, sulfur, and/or nitrogen atoms. The aromatic moieties and polyalkylene oxide chains can optionally be further substituted, for example, with one or more hydroxyl, alkyl, alkoxy, alkylamino, aryl, aryloxy, arylamino, heteroaryl, heteroaryloxy, heteroarylamino, aralkyl, halogen, sulfonic acid groups (including salts, esters, or amides thereof), carboxylic acid groups (including salts, esters, or amides thereof), or phosphonic acid groups (including salts, esters, or amides thereof).

Preferred aromatic polyalkylene oxide dispersants include compounds having the general formula (I)

Ar—X—[Alk—O]$_m$—Alk—Y—R  (I)

wherein

Ar is an aromatic hydrocarbon group (preferably phenyl or naphthyl, particularly phenyl substituted with $C_1$–$C_{20}$ alkyl or $C_7$–$C_{16}$ aralkyl groups) or a heteroaromatic group in which one or more ring atoms are N, O, S, or a combination thereof;

Alk is $C_2$–$C_6$ alkylene (preferably ethylene and/or 1,2-propylene);

x represents a direct bond or a —O—, —S—, —NR$^1$—, —SO$_2$—, —CO—, —Alk$^1$—, or —Ar$^1$— bridging group or a chemically reasonable combination of one or more —O—, —S—, —NR$^1$—, —SO$_2$—, —CO—, —Alk$^1$—, or —Ar$^1$—groups, wherein R$^1$ is hydrogen, $C_1$–$C_6$ alkyl, $C_5$–$C_7$ cycloalkyl, $C_7$–$C_{16}$ aralkyl, an aromatic hydrocarbon group (preferably phenyl), a heteroaromatic group in which one or more ring atoms are N, O, S, or a combination thereof, $C_2$–$C_8$ alkanoyl, $C_7$–$C_{16}$ aralkanoyl, $C_7$–$C_{11}$ aroyl, ($C_1$–$C_6$ alkoxy)carbonyl, ($C_7$–$C_{16}$ aralkoxy)-carbonyl, ($C_6$–$C_{10}$ aryloxy)carbonyl, carbamoyl, ($C_1$–$C_6$ alkylamino)carbonyl, or ($C_6$–$C_{10}$ arylamino) carbonyl, or $R^1$ can be attached to Ar though a direct bond or indirectly through one or more —$SO_2$—, —CO—, or —$Alk^1$— to form a fused-on five- or six-membered ring (preferably a phthalimide or naphthalimide group), $Alk^1$ is $C_1$–$C_8$ alkylene or $C_5$–$C_7$ cycloalkylene, and $Ar^1$ is $C_6$–$C_{10}$ arylene;

R is hydrogen, $C_1$–$C_{20}$ alkyl (preferably $C_1$–$C_6$ alkyl), $C_2$–$C_{20}$ alkenyl or alkadienyl, $C_5$–$C_7$ cycloalkyl, $C_5$–$C_7$ cycloalkenyl or cycloalkadienyl, $C_7$–$C_{16}$ aralkyl, an aromatic hydrocarbon group (preferably phenyl or naphthyl), a heteroaromatic group in which one or more ring atoms are N, O, S, or a combination thereof, $C_2$–$C_8$ alkanoyl, $C_7$–$C_{16}$ aralkanoyl, $C_7$–$C_{11}$ aroyl, ($C_1$–$C_6$ alkoxy)carbonyl, ($C_7$–$C_{16}$ aralkoxy) carbonyl, ($C_6$–$C_{10}$ aryloxy)carbonyl, carbamoyl, ($C_1$–$C_6$ alkylamino)carbonyl, ($C_6$–$C_{10}$ arylamino) carbonyl, a sulfonic acid group or a salt, ester, or amide thereof, a carboxylic acid group or a salt, ester, or amide thereof, a phosphonic acid group or a salt, ester, or amide thereof, or, if Y is a direct bond, an amino or ammonium group or a halogen atom;

Y represents a direct bond or a —O—, —S—, —$NR^2$—, —$SO_2$—, —CO—, —$Alk^2$—, or —$Ar^2$—bridging group or a chemically reasonable combination of one or more —O—, —S—, —$NR^2$—, —$SO_2$—, —CO—, —$Alk^2$—, or —$Ar^2$— groups, wherein $R^2$ is hydrogen, $C_1$–$C_6$ alkyl, $C_5$–$C_7$ cycloalkyl, $C_7$–$C_{16}$ aralkyl, an aromatic hydrocarbon group (preferably phenyl), a heteroaromatic group in which one or more ring atoms are N, O, S, or a combination thereof, $C_2$–$C_8$ alkanoyl, $C_7$–$C_{16}$ aralkanoyl, $C_7$–$C_{11}$ aroyl, ($C_1$–$C_6$ alkoxy)carbonyl, ($C_7$–$C_{16}$ aralkoxy)-carbonyl, ($C_6$–$C_{10}$ aryloxy)carbonyl, carbamoyl, ($C_1$–$C_6$ alkylamino)carbonyl, or ($C_6$–$C_{10}$ arylamino) carbonyl, with the proviso that when R is alkyl, alkenyl, alkadienyl, cycloalkyl, cycloalkenyl, cycloalkadienyl, aralkyl, an aromatic hydrocarbon group, a heteroaromatic group, alkanoyl, aralkanoyl, aroyl, alkoxycarbonyl, aralkoxycarbonyl, aryloxycarbonyl, carbamoyl, alkylaminocarbonyl, or arylaminocarbonyl (preferably a phenyl or naphthyl group), then $R^2$ can also be attached to R directly though a bond or indirectly through one or more —$SO_2$—, —CO—, or —$Alk^2$— to form a five- or six-membered ring (preferably a phthalimide or naphthalimide group), $Alk^2$ is $C_1$–$C_8$ alkylene or $C_5$–$C_7$ cycloalkylene, and $Ar^2$ is $C_6$–$C_{10}$ arylene; and m is from about 2 to about 100 (preferably from 5 to 50, more preferably from 10 to 30).

Although generally less preferred, compounds in which the group Ar is substituted with more than one group (preferably two or three groups) of the formula

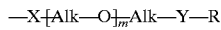

are also suitable aromatic polyalkylene oxide dispersants.

As used herein, the term "aromatic hydrocarbon group" refers to phenyl and 1- or 2-naphthyl, as well as groups derived from other fused-ring aromatic hydrocarbons. Aromatic hydrocarbon groups that possess at least some degree of pigmentary properties, although generally less preferred, are included within the meaning of "aromatic hydrocarbon groups." The term "aromatic hydrocarbon group" also includes aromatic hydrocarbons that are ring-substituted with known substituents, such as $C_1$–$C_{20}$ alkyl (including alkyl in which one or more carbon atoms are replaced by oxygen, sulfur, or nitrogen such that hetero atoms are not adjacent), $C_1$–$C_{20}$ alkoxy (including alkoxy in which one or more carbon atoms are replaced by oxygen, sulfur, or nitrogen such that hetero atoms are not adjacent), $C_1$–$C_{20}$ alkylamino (including alkylamino in which one or more carbon atoms are replaced by oxygen, sulfur, or nitrogen such that hetero atoms are not adjacent), $C_7$–$C_{30}$ aralkyl (such as benzyl or benzyl substituted at any carbon atom), halogen, hydroxy (including tautomeric oxo forms), cyano, nitro, and various carboxy and sulfoxy derivatives (such as the free acids or salts, esters, and amides), as well as other known groups.

The term "heteroaromatic group" refers to five- or six-membered aromatic groups, as well as fused ring analogs thereof, in which at least one ring atom is N, O, S, or a combination thereof. Heteroaromatic groups that possess at least some degree of pigmentary properties, although generally less preferred, are included within the meaning of "heteroaromatic groups." The term "heteroaromatic group" also includes heteroaromatic groups that are ring-substituted with hydroxy (including the tautomeric oxo forms) and other substituents such as described above with respect to aromatic hydrocarbon groups. Suitable heteroaryl groups include those attached at a ring carbon atom adjacent to one or two (preferably two) ring heteroatoms (such as in 2-pyrimidinyl, 2-imidazolyl, 2-diazolyl, 2-thiazolyl, 2-oxazolyl, and the like) or, where chemically reasonable, at a ring nitrogen atom.

The terms "$C_1$–$C_8$ alkylene" and "$C_2$–$C_6$ alkylene" refer to straight or branched chain aliphatic hydrocarbon groups having, respectively, from 1 to 8 carbon atoms and 2 to 6 carbon atoms and two sites of attachment. Examples of such alkylene groups are methylene, ethylene, propylene, butylene, pentylene, hexylene, heptylene, octylene, and isomeric forms thereof. Preferred alkylene groups are ethylene and 1,2-propylene. The term "$C_5$–$C_7$ cycloalkylene" similarly refers to cycloaliphatic hydrocarbon groups having from 5 to 7 carbon atoms and two sites of attachment. The term "$C_6$–$C_{10}$ arylene" refers to aromatic hydrocarbon groups as described above except for having two sites of attachment. Examples of $C_6$–$C_{10}$ arylene are o-, m-, and p-phenylene and substituted derivatives thereof.

The terms "$C_1$–$C_6$ alkyl" and "$C_1$–$C_{20}$ alkyl" refer to straight or branched chain aliphatic hydrocarbon groups having, respectively, from 1 to 6 carbon atoms and 1 to 20 carbon atoms. Examples of such alkyl groups are methyl, ethyl, propyl, butyl, pentyl, hexyl, lauryl (i.e., dodecyl), myristyl (i.e., tetradecyl), cetyl (i.e., hexadecyl), stearyl (i.e., octadecyl), eicosanyl, docosanyl (i.e., behenyl), and the isomeric forms thereof. The term "$C_1$–$C_{20}$ alkoxy" refers to straight or branched chain alkyl oxy groups having from 1 to 20 carbon atoms. Examples of $C_1$–$C_{20}$ alkoxy are methoxy, ethoxy, propoxy, butoxy, pentyloxy, hexyloxy, and the isomeric forms thereof. Alkyl and alkoxy groups in which one or more carbon atoms are replaced by oxygen atoms, such that no two oxygen atoms are adjacent to each other, include polyalkylene oxide groups attached through a carbon atom or oxygen atom, respectively. The terms "$C_2$–$C_{20}$ alkenyl" and "alkadienyl" refer to alkyl groups having, respectively, one or two carbon-carbon double bonds within the chain. The term "$C_5$–$C_7$ cycloalkyl" refers to cycloaliphatic hydrocarbon groups having from 5 to 7 carbon atoms. Examples of $C_5$–$C_7$ cycloalkyl are cyclopentyl, cyclohexyl, and cycloheptyl. The terms "$C_5$–$C_7$ cycloalkenyl" or "cycloalkadienyl" refer to cycloalkyl groups having, respectively, one or two carbon-carbon double bonds within the ring. The terms "$C_7$–$C_{16}$ aralkyl" and "$C_7$–$C_{30}$ aralkyl" refer, respectively, to $C_1$–$C_6$ alkyl substituted with phenyl or naphthyl (which may optionally be ring substituted as discussed above) such that the total number of carbon atoms is from 7 to 16 and $C_1$–$C_{24}$ alkyl substituted with one or more benzene or naphthalene rings (which may optionally be ring substituted as discussed above) such that the total number of carbon atoms is from 7 to 30. Examples of aralkyl are benzyl, phenethyl, and naphthylmethyl.

The term "$C_2$–$C_8$ alkanoyl" refers to straight or branched chain alkanoyl groups having from 2 to 8 carbon atoms. Examples of $C_2$–$C_8$ alkanoyl are acetyl, propanoyl, butanoyl, pentanoyl, hexanoyl, heptanoyl, octanoyl, and the isomeric forms thereof. The term "$C_7$–$C_{16}$ aralkanoyl" refers to $C_1$–$C_6$ alkanoyl substituted with benzene or naphthalene such that the total number of carbon atoms is from 7 to 16. An example of $C_7$–$C_{11}$ aralkanoyl is phenacetyl. The term "$C_7$–$C_{11}$ aroyl" refers to benzoyl and 1- or 2-naphthoyl. The term "($C_1$–$C_6$ alkoxy)carbonyl" refers to straight or branched chain alkoxycarbonyl groups having from 1 to 6 carbon atoms in the alkoxy portion. Examples of ($C_1$–$C_6$ alkoxy)carbonyl are methoxycarbonyl, ethoxycarbonyl, propoxycarbonyl, butoxycarbonyl, pentyloxycarbonyl, hexyloxycarbonyl, and the isomeric forms thereof. The term "($C_7$–$C_{16}$ aralkoxy)carbonyl" refers to ($C_1$–$C_6$ alkoxy) carbonyl substituted with $C_6$–$C_{10}$ aryl such that the total number of carbon atoms in the aralkoxy portion is from 7 to 16. An example of ($C_7$–$C_{16}$ aralkoxy)carbonyl is benzyloxycarbonyl (also known as carbobenzoxy). The term "($C_6$–$C_{10}$ aryloxy)carbonyl" refers to phenoxycarbonyl and 1- or 2-naphthoxycarbonyl.

The term "carbamoyl" refers to an unsubstituted aminocarbonyl group. The term "($C_1$–$C_6$ alkylamino)carbonyl" refers to straight or branched chain alkylamino-substituted carbonyl groups having from 1 to 6 carbon atoms in the alkylamino portion. Examples of ($C_1$–$C_6$ alkanoyl)-amino are methylaminocarbonyl (also known as N-methylcarbamoyl), ethylaminocarbonyl, and the like. Such alkylaminocarbonyl groups can optionally be N-substituted with alkyl or aryl groups. The term "($C_6$–$C_{10}$ arylamino)carbonyl" refers to phenylaminocarbonyl (or anilinocarbonyl) and 1- or 2-naphthylaminocarbonyl. Such arylaminocarbonyl groups can optionally be N-substituted with alkyl or aryl groups.

The group represented by R can be various amino or ammonium groups when attached to a carbon atom (i.e., where Y is a direct bond). Suitable amino groups can be represented by the formula —$NR^aR^b$, where $R^a$ and $R^b$ are independently hydrogen, $C_1$–$C_6$ alkyl, $C_7$–$C_{16}$ aralkyl, or $C_6$–$C_{10}$ aryl. Suitable ammonium groups can be represented by the formula —$NR^cR^dR^e$, where $R^c$, $R^d$, and $R^e$ are independently hydrogen, $C_1$–$C_6$ alkyl, $C_7$–$C_{16}$ aralkyl, or $C_6$–$C_{10}$ aryl and where each such ammonium group is electrically balanced with a stoichiometric amount of an anion (preferably halide, sulfate, phosphate, nitrate, mesylate, or tosylate or, less preferably, hydroxide or carbonate).

The group represented by R can also be a halogen atom when attached directly to a carbon atom (i.e., where Y is a direct bond). Suitable halogens are fluorine, chlorine, bromine, and iodine (preferably fluorine or chlorine).

For compounds in which X represents a bridging group (i.e., where X is not a direct bond), the bridging group can be —O—, —S—, —$NR^1$—, —$SO_2$—, —CO—, —$Alk^1$—, or —$Ar^1$— group or any chemically reasonable combinations of such groups. Chemically reasonable combinations of —O—, —S—, —$NR^1$—, —$SO_2$—, —CO—, —$Alk^1$—, or —$Ar^1$— groups are those in which adjacent atoms, both within the bridge and between the bridge and the groups Ar and Alk to which they are attached, are stable under the conditions used to prepare and use the dispersible organic pigments of the invention. Preferred combinations of such groups include esters and amides (such as —O—CO—, —CO—O—, —$NR^1$–CO—, —CO—$NR^1$—, —O—$SO_2$—, —$SO_2$—O—, —$NR^1$—$SO_2$—, or —$SO_2$—$NR^1$—), combinations of —$Alk^1$— and —$Ar^1$—, and ester and amide groups combined with —$Alk^1$— and —$Ar^1$— groups. A preferred one-atom bridging group is —O—.

For compounds in which Y represents a bridging group (i.e., where Y is not a direct bond), the bridging group can be —O—, —S—, —$NR^2$—, —$SO_2$—, —CO—, —$Alk^2$—, or —$Ar^2$— group or any chemically reasonable combinations of such groups. Chemically reasonable combinations of —O—, —S—, —$NR^2$—, —$SO_2$—, —CO—, —$Ar^2$— groups are those in which adjacent atoms, both within the bridge and between the bridge and the groups R and Alk to which they are attached, are stable under the conditions used to prepare and use the dispersible organic pigments of the invention. Group Y is preferably the one-atom bridging group —O—.

More preferred aromatic polyalkylene oxide dispersants include compounds having the general formula (I)

wherein
Ar is an aromatic hydrocarbon group (preferably phenyl or naphthyl, particularly phenyl substituted with $C_1$–$C_{20}$ alkyl or $C_7$–$C_{16}$ aralkyl groups);
Alk is $C_2$–$C_6$ alkylene (preferably ethylene and/or 1,2-propylene);
X represents a direct bond or a —O—, —$NR^1$—, —$SO_2$—, —CO—, —$Alk^1$—, or —$Ar^1$— bridging group or a chemically reasonable combination thereof, wherein
  $R^1$ is hydrogen or $C_1$–$C_6$ alkyl or $R^1$ is attached to Ar though a direct bond or indirectly through one or more —$SO_2$—, —CO—, or —$Alk^1$— to form a fused-on five- or six-membered ring (preferably a phthalimide or naphthalimide group),
  $Alk^1$ is $C_1$–$C_8$ alkylene, and
  $Ar^1$ is $C_6$–$C_{10}$ arylene;
R is hydrogen, $C_1$–$C_{20}$ alkyl (preferably $C_1$–$C_6$ alkyl), $C_7$–$C_{16}$ aralkyl, an aromatic hydrocarbon group (preferably phenyl or naphthyl), $C_2$–$C_8$ alkanoyl, $C_7$–$C_{11}$ aroyl, a sulfonic acid group or a salt, ester, or amide thereof, a carboxylic acid group or a salt, ester, or amide thereof, or a phosphonic acid group or a salt, ester, or amide thereof;
Y represents a direct bond or a —O—, —$NR^2$—, —$SO^2$—, —CO—, —$Alk^2$—, or- $Ar^2$— bridging group or a chemically reasonable combination thereof, wherein $R^2$ is hydrogen or $C_1$–$C_6$ alkyl, $Alk^2$ is $C_1$–$C_8$ alkylene, and $Ar^2$ is $C_6$–$C_{10}$ arylene; and
m is from about 2 to about 100 (preferably from 5 to 50, more preferably from 10 to 30).

Particularly preferred aromatic polyalkylene oxide dispersants include compounds of formula (I)

in which Ar is an aromatic hydrocarbon group such as phenyl or naphthyl (which can optionally be ring-substituted as described above, particularly with $C_1$–$C_{20}$ alkyl or $C_7$–$C_{30}$ aralkyl groups); X is a direct bond, O, or —CO—NR$^1$— or —SO$_2$—NR$^1$— in which R$^1$ is hydrogen or alkyl (i.e., an amide) or is attached to the aromatic group through a —CO— group to form an imide (e.g., a phthalimide or naphthalimide group); Alk is ethylene, 1,2-propylene, or a combination thereof; m ranges from about 2 to about 100 (preferably from 5 to 50, more preferably from 10 to 30); and -Y-R is OH or $C_1$–$C_6$ alkoxy.

Examples of such aromatic polyalkylene oxide dispersants are described in U.S. Pat. Nos. 4,186,029, 4,373,930, 4,403,077, 4,436,522, 4,872,916, 5,073,585, 5,266,622, 5,466,482, 5,494,511, 5,855,662, 5,935,272, and 5,922,122, British Patent 2,090,876, and German Offenlegungsschrift 19,811,791.

Examples of commercially available nonionic aromatic polyethylene oxide dispersants include Emulgator 386 and Emulgator WN (both available from Bayer) and Solsperse 27000 (available from Avecia).

Another suitable dispersant, which can be prepared as described herein, is represented by the formula

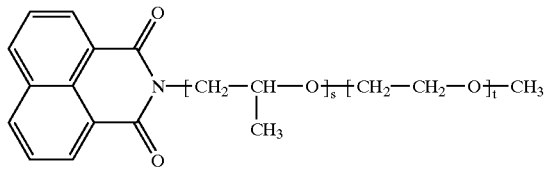

where, on average, s is about 3 and t is about 19.

The concentration of the aromatic polyalkylene oxide dispersant is at least about 1% by weight relative to the organic pigment but is preferably 1 to 100% by weight, more preferably 10 to 50% by weight, and most preferably 15 to 25% by weight.

Milling Liquids

The process of the present invention involves a milling mixture comprising one or more crude organic pigments, one or more aromatic polyalkylene oxide dispersants, and an optional milling liquid.

Suitable milling liquids, if used at all, include water; lower aliphatic alcohols (such as methanol), ketones and ketoalcohols (such as acetone, methyl ethyl ketone, and diacetone alcohol), amides (such as dimethylformamide and dimethylacetamide), ethers (such as tetrahydrofuran and dioxane), alkylene glycols and triols (such as ethylene glycol and glycerol), and other organic liquids known in the art; and mixtures thereof. Other liquids can be used but are generally less preferred.

The quantity of the milling liquid is about 0 to about 10 parts by weight (preferably 0.1 to 5 parts by weight and more preferably 0.5 to 4 parts by weight) relative to the organic pigment. However, the quantity of liquid is somewhat dependent on the amount of aromatic polyalkylene oxide dispersant that is to be used. Larger quantities of the dispersant can generally be used for wet milling than for dry milling. For example, when using 15% by weight of the aromatic polyalkylene oxide dispersant relative to the organic pigment, about one part by weight of the milling liquid is typically used. Less dispersant must ordinarily be used during dry milling.

Milling Additives

Milling additives may also be added in conventional quantities (e.g., 0.1% to 50% by weight relative to the pigment) to a milling mixture. Examples of suitable milling additives include inorganic compounds (such as metal salts), surfactants, dispersants other than the aromatic polyalkylene oxide dispersants specified above (such as sulfonamide, carboxamide, or aminoalkyl derivatives of organic pigments, particularly of perylenes, phthalocyanines, or quinacridones), wetting agents, defoamers, grinding aids, latices, or mixtures thereof. In certain cases, one or more inorganic and/or organic bases may be added, especially if the aromatic polyalkylene oxide dispersant contains acidic functional groups.

Surface Treatment Additives

Before, during, or even after milling, a pigment may be treated with a suitable surface treatment additive that can be added directly to the milling mixture. Suitable surface treatment additives include acrylic copolymers; fatty acids (such as stearic acid or behenic acid) and corresponding amides, esters, or salts thereof (such as magnesium stearate, zinc stearate, aluminum stearate, or magnesium behenate); resin acids (such as abietic acid, rosin soap, hydrogenated or dimerized rosin); $C_{12}$–$C_{18}$ paraffin-disulfonic acids; sulfonated dicarboxylic acids; corresponding esters or amides thereof (such as sulfosuccinates, sulfosuccinamates, and derivatives thereof); alkyl phosphates and phosphonates; long chain fatty amines (such as laurylamine or stearylamine); polyamines (such as polyethylenimines); quaternary ammonium compounds (such as tri[($C_1$–$C_4$ alkyl)benzyl]ammonium salts); alkylphenols; alcohols and diols (such as stearyl alcohol and dodecane-1,2-diol); alkoxylated fatty acids and amides, alkoxylated alcohols, alkoxylated alkylphenols, and glycol esters; waxes (such as polyethylene wax); polyurethanes; plasticizers (such as epoxidized soya bean oil); or combinations thereof. Such additives can be incorporated in amounts ranging up to about 20% by weight (preferably 0.1 to 20% by weight, more preferably 0.1 to 5% by weight), based on the amount of the organic pigment.

Before the milling step is carried out, the organic pigment (or a mixture of organic pigments), one or more aromatic polyalkylene oxide dispersants, the milling liquid (or mixture thereof), and, optionally, one or more milling additives and/or one or more surface treatment additives may be combined in any order. Preferably, all such components are combined prior to the milling such that the total solids content in the milling mixture is at least about 10% by weight (more preferably 20 to 50% by weight).

Milling is carried out using known dry milling methods, such as jet milling, ball milling, and the like, or known wet-milling methods, such as salt kneading, sand milling, bead milling, and the like. Although the particular milling apparatus is generally not critical, suitable mills include horizontal mills (for example, Eiger mills, Netzsch mills, and Super mills), vertical mills, ball mills, attritors, vibratory mills, and the like containing various grinding media. Suitable grinding media include salt, sand, glass beads (such as barium titanate, soda lime, or borosilicate beads), ceramic beads (such as zirconia, zirconium silicate, and alumina beads), or metal beads (such as stainless steel, carbon steel, and tungsten carbide beads). Suitable mills and methods are discussed, for example, in U.S. Pat. No. 5,704,556, and *Pigment Handbook*, Vol. III (New York: John Wiley & Sons, 1973), page 396. Regardless of the particular milling method used, the mixture of the crude organic pigment, the aromatic polyalkylene oxide dispersant, and the optional components is milled until the desired particle size and particle distribution are obtained. Depending on the specific mill used, milling is generally carried out at a temperature of about 0° C. to about 60° C. (preferably 15° C. to 40° C.). Milling times generally depend on the quantities being milled and the volume of the mill. For example, when using a mill having an empty milling chamber volume of 300 to 500 ml, a slurry containing about 700 g of pigment at a solids content of 30 to 50%, is generally milled for about three to about eight hours (typically about five hours).

After the milling step and any optional post-milling procedures are completed, the pigment or milling mixture can optionally be subjected to treatment with a liquid in which the organic pigment is substantially insoluble. Such liquids, which can also be referred to as non-solvents, can be the same or different from the milling liquids described above or can be liquids not generally used for milling. Examples of suitable liquids for this purpose include water; inorganic acids (such as sulfuric or phosphoric acid); organic acids (such as formic or acetic acid); alcohols (such as methanol, ethanol, or ethylene glycol); cyclic or open-chain ethers (such as dioxane, tetrahydrofuran, ethylene glycol monoalkyl or dialkyl ethers, and oligo- and polyglycol ethers); ketones (such as acetone or methyl ethyl ketone); aromatics (such as toluene, xylene, chlorobenzene, nitrobenzene, or chloronaphthalene); esters (such as methyl benzoate, dimethyl phthalate, dimethyl succinate, or methyl salicylate); amides (such as formamide, dimethylformamide, or N-methylpyrrolidone); and mixtures thereof. Such liquids, if added at all, should be used in amounts such that the total solids content is not reduced below about 10% (preferably not below 20%, more preferably not below 40%).

Solvent treatments are generally carried out at temperatures between about 10° C. and about 200° C. (preferably at elevated temperatures in the range of 60° C. to 145° C.).

The use of acids as the non-solvent liquid can promote flocculation (and thereby facilitate isolation), as well as improve the binding of the aromatic polyalkylene oxide dispersant to the pigment surface. Suitable such acids include dilute mineral acids (such as hydrochloric, sulfuric, phosphoric, or mixtures thereof); and organic acids (such as acetic, formic or mixtures thereof).

Inorganic salts (primarily divalent metal salts), organic salts (primarily quaternary ammonium salts), or mixtures thereof can also be used to flocculate the milled pigment to aid in isolation.

After milling is completed, the resultant pigment may be separated from the milling mixture by one or more isolation methods known in the art, preferably methods that do not involve formation of a wet filtercake or presscake. Particularly suitable methods for collecting highly dispersible pigments of the invention include spray drying and lyophilization. It is generally less preferable to collect the pigment by filtration, tray drying, spin flash drying, centrifugation, or decantation.

Pigments prepared according to the present invention are suitable for use in a variety of pigment applications, particularly in view of their excellent dispersibility, as well as their light stability and migration properties. Pigments produced from the processes of the present invention are highly dispersible without sacrificing color properties in wet and/or dried coating systems. For example, the conditioned pigments can be dried and used as components in coating systems. Conditioned pigments prepared by the processes of the present invention are readily dispersible, for example, in aqueous coating systems. The conditioned pigments may be mixed with other materials such as pigment formulations (including inorganic white pigments, such as titanium dioxide (rutile), cement, inorganic pigments, flushed pastes with organic liquids or pastes, pigment dispersions with water, dispersants, and, if appropriate, preservatives), coating compositions (including paints, preferably automotive paint, electronic coating paints, physically or oxidatively drying lacquers, stoving enamels, reactive paints, two-component paints, solvent- or water-based paints, emulsion paints for weatherproof coatings and distempers, printing ink, including ink jet inks, or colored paper).

The conditioned pigments of the present invention are suitable for use with macromolecular materials, especially synthetically produced macromolecular materials. Examples include plastic materials, such as polyvinyl chloride, polyvinyl acetate, and polyvinyl propionate; polyolefins, such as polyethylene and polypropylene; high molecular weight polyamides; polymers and copolymers of acrylates, methacrylates, acrylonitrile, acrylamide, butadiene, or styrene; polyurethanes; and polycarbonates. Other suitable macromolecular substances include those of a natural origin, such as rubber; those obtained by chemical modification, such as acetyl cellulose, cellulose butyrate, or viscose; or those produced synthetically, such as polymers, polyaddition products, and polycondensates. Materials containing conditioned pigments of the present invention may have any desired shape or form, including molded articles, films, and fibers.

The following examples further illustrate the present invention and are not intended to limit either the spirit or scope of the present invention. Those skilled in the art will readily understand that other variations exist. Unless otherwise noted, all temperatures are degrees Celsius, all percentages and parts are percentages by weight and parts by weight, respectively.

EXAMPLES

The process of making conditioned pigments of the present invention involves milling a milling mixture comprising a crude organic pigment, an aromatic polyalkylene oxide dispersant, and a milling liquid. Examples of aromatic polyalkylene oxide dispersants used in the present invention are provided below.

Dispersibilities

Dispersibilities were determined by the laser scattering technique using a Brookhaven Instruments Laser Scattering Particle Size Analyzer equipped with a Bl-9000 Correlator detector using a photomultiplier tube voltage of 1.75 kV, a laser wavelength of 632.8 nm, a beam width of 1 mm (nonpolarized), a detection angle of 90°, and a cell length of 12 mm.

Pigments according to the invention were readily dispersed using the following procedure and did not require standard mulling and/or sonication methods for dispersion. Pigments that were not readily dispersed were not tested for dispersibility.

Approximately 0.05 g of each pigment sample was weighed into a glass container to which was then added 15 ml of deionized water. The container was capped and shaken by hand for one minute. One drop of this concentrate was added to a glass test tube (12 mm by 75 mm) containing 4 ml of deionized water and inverted to mix. The resultant mixture was added at a rate of 3 drops per second to a second glass test tube (12 mm by 75 mm) containing 4 ml of deionized water (except for Example 2, which used 5 ml of deionized water) until a detector count rate of 2 to 5 kilocounts per second (kcps) is reached. Effective diameters and polydispersities (a measure of particle size distribution) for the test samples are given in Table 1.

Pigments prepared according to Comparison Examples 2 to 7 would not disperse in water and thus could not be analyzed for dispersibility.

13

Paint Testing

Water-based paint tests were carried out on pigments described above using a waterborne basecoat/solvent-borne clearcoat paint system. Aqueous dispersions were prepared using a mixture of 12.4% AROLON® 559-G4-70 acrylic resin (Reichhold Chemicals, Inc.), 3.2% SOLSPERSE® 27000 hyperdispersant (Zeneca, Inc.), 1.6% 2-amino-2-methyl-1-propanol (Angus Chemical), and 18% conditioned organic pigment which gave a pigment-to-binder ratio of 3:2 and a total solids content of 30%. The pigment-to-binder ratio was then reduced to 1:4 with additional AROLON® 559-G4-70 acrylic resin (total amount 26%) and 25% CYMEL® 325 melamine/formaldehyde resin (Cytec Industries), which gave a total solids content of 50%. Masstone and transparency measurements were made using films applied at 76 μm and 38 μm wet film thickness, respectively, and allowed to stand at room temperature for fifteen minutes and at 100° C. for five minutes. Clearcoats containing a mixture of 80% of AROPLAZ® 1453-X-50 alkyd resin (Reichhold Chemicals, Inc.) and 20% CYMEL® 325 melamine/formaldehyde resin at a total solids level of 57% were then applied over the basecoat at a 76 μm wet film thickness and allowed to stand at room temperature for fifteen minutes and at 121° C. for fifteen minutes.

Undertone tint paints were prepared from the reduced aqueous dispersions described above having a pigment-to-binder ratio of 1:4 by adding additional AROLON® 559-G4-70 acrylic resin, CYMEL® 325 melamine/formaldehyde resin, and 35% TINT-AYD® CW-5003 white dispersion (Daniel Products Company), which gave a pigment-to-binder ratio of 1:1.1, a total solids content of 55%, and a $TiO_2$-to-pigment ratio of 9:1. Color measurements were made using films applied at 38 μm wet film thickness and allowed to stand at room temperature for fifteen minutes and at 100° C. for five minutes. Clearcoats were then applied and baked as described above.

Metallic paints were prepared from the dispersion described above having a pigment-to-binder ratio of 3:2 using a water-dispersible aluminum pigment (available as HYDRO PASTE® 8726 from Silberline Manufacturing Co., Inc.), AROLON® 559-G4-70 acrylic resin, and CYMEL® 325 melamine/formaldehyde resin in quantities that provided a pigment-to-binder ratio of 1:2, an aluminum-to-pigment ratio of 1:4, and a total solids content of 43%. Color measurements were made using films applied at 38 μm wet film thickness and baked as described above. Clearcoats were then applied and baked as described above.

The coloristic values for paints containing the conditioned organic pigments were obtained on a CS-5 Chroma Sensor spectrometer from Datacolor International using a D65 illuminant at an angle of 10 degrees. All values for ΔL, ΔH, ΔC, and transparency were measured relative to corresponding crude organic pigment that has not been treated with a polyethylene oxide-based dispersant. Positive values for ΔL, ΔH, ΔC, and transparency correspond to lighter, yellower, more chromatic, and more transparent samples, respectively. Subjective qualitative evaluations of flop were determined by a skilled observer.

Dispersants

The following commercially available dispersants were used in the examples and comparison examples:

Dispersant 1: A nonionic aromatic ethoxylate available as Solsperse 27000 from Avecia Dispersant 2: A nonionic aromatic ethoxylate available as Emulgator 368 from Bayer Dispersant 3: A nonionic aromatic ethoxylate available as Emulgator WN from Bayer Comparison Dispersant C1: Carbowax 1000 (available from Union Carbide), a hydroxy-terminated polyethylene oxide having a molecular weight of about 1000

14

Comparison Dispersant C2: Arolon 559-G4-70 acrylic resin (available from Reichhold)

Comparison Dispersant C3: Jeffamine XTJ-506 (available from Huntsman), an amine having an average molecular weight of 1000 and having the formula

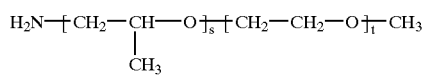

where, on average, s is about 3 and t is about 19.

Comparison Dispersant C4: Florasolvs Jojoba-PEG 80 (available from International Flora Technologies), a non-aromatic jojoba oil extract coupled to a polyoxyethylene chain of, on average, 80 repeat units and having a molecular weight of about 3800 Other dispersants used in the examples according to the invention were prepared as described below.

Dispersant 4

To an autoclave containing 250 g of deionized water was added 19.8 (0.100 mol) of 1,8-naphthalic anhydride and 105 (0.105 mol) of Jeffamine XTJ-506. The autoclave was sealed, heated with stirring to 150° C., and maintained at 150° C. for five hours. After the reaction had cooled, the resultant brown liquid was discharged into a beaker to which was then added 15 g of decolorizing charcoal. After stirring overnight, the suspension was filtered and the filter cake washed with water, yielding approximately 500 g of an amber-colored filtrate having a 23.63% solids content. Analysis of the liquid by HPLC indicated a majority of the desired condensation product having the formula

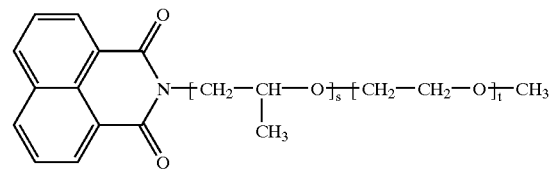

where, on average, s is about 3 and t is about 19.

Example 1

A 700 g portion of crude N,N-dimethylperylenediimide pigment (C.I. Pigment Red 179) was combined with 105 g of Dispersant 1 (15% active on pigment) in 1050 g of water. The slurry was stirred for one hour to generate a homogeneous slurry. The slurry was added to a horizontal media mill charged with 0.3 to 0.4 mm zirconium silicate beads and milled for five hours. Due to water evaporation during the milling, the solids content at the conclusion of the milling was 49.50%. After milling was complete, the mill was discharged and rinsed with water and the combined slurry and wash water spray dried to yield approximately 700 g of conditioned pigment.

Test results for dispersibility are given in Table 1 and for color properties are given in Table 2.

Example 2

The procedure of Example 1 was followed with the following exceptions: 700 g of crude perylene pigment and 105 g of Dispersant 2 (15% active on-pigment) were slurried initially in 1000 g of water. The slurry was milled for five hours, during which time water was added to thin the milling mixture such that the overall solids content at the end of the milling was 28.71%. After the milling, the discharged slurry and mill wash water were combined and spray dried to yield 656 g of conditioned pigment.

Test results for dispersibility are given in Table 1 and for color properties are given in Table 2.

Example 3

The procedure of Example 1 was followed with the following exceptions: 700 g of crude perylene pigment and 115.8 g of Dispersant 3 (90.68% active, 15% active on-pigment) were slurried initially in 1000 g of water. The slurry was milled for five hours, during which time water was added to thin the milling mixture such that the final solids at the end of the milling was 26.36%. After the milling, the discharged slurry and mill wash water were combined and spray dried to yield 592 g of finished pigment.

Test results for dispersibility are given in Table 1 and for color properties are given in Table 2.

Example 4

The procedure of Example 1 was followed with the following exceptions: 500 g of crude perylene pigment and 317 g of Dispersant 4 (23.63% active, 15% active on-pigment) were slurried initially in 600 g of water. The slurry was milled for five hours, at the beginning of which approximately 1 g of 2-amino-2-methyl-1-propanol (available as AMP-95 from Angus Chemical) was added to raise the pH and thin the slurry. The final solids content at the end of the milling was 41.56%. After the milling, the discharged slurry and mill wash water were combined and spray dried to yield 412 g of finished pigment.

Test results for dispersibility are given in Table 1 and for color properties are given in Table 2.

Comparison Example 1

The procedure of Example 1 was followed with the following exceptions: 500 g of crude perylene pigment and 75 g of Comparison Dispersant C1 (15% active on-pigment) were slurried initially in 600 g of water. During the milling, the slurry thickened rapidly. Approximately 1 g of AMP-95 was added to raise the pH and thin the slurry. Additional water was added during the first 45 minutes of milling such that the overall solids content of the slurry, which had thickened to the point at which it could not be milled, was 18.5%.

This unusable slurry was discarded without further analysis.

Comparison Example 2

The crude N,N-dimethylperylenediimide pigment starting material used in the examples was examined using laser scattering without milling or the addition of any aromatic polyalkylene oxide dispersant.

The pigment could not be dispersed in water and thus was not tested for dispersibility. However, Comparison Example 2 served as the standard for the color testing reported in Table 2.

Comparison Example 3

A 750 g portion of crude perylene pigment presscake (33% solids) was combined with 500 g of deionized water, 1 g of ammonium hydroxide, and 25 g of Dispersant 1 (10% active on-pigment). The slurry was not milled but was instead stirred using a Cowles blade for two hours. The resulting slurry spray was dried to yield 272 g of pigment.

The pigment could not be dispersed in water and thus was not tested for dispersibility. Test results for color properties are given in Table 2.

Comparison Example 4

Comparison Example 3 was repeated except for using 15% active on-pigment Dispersant 1.

The pigment could not be dispersed in water and thus was not tested for dispersibility. Test results for color properties are given in Table 2.

Comparison Example 5

The procedure of Example 1 was followed with the following exceptions: 200 g of crude perylene pigment were slurried in 800 g water containing 42.85 g of Comparison Dispersant C2 (70% active, 15% active on pigment) and 6 g of AMP-95. The slurry was milled for five hours. After the milling was complete, the mill was discharged and rinsed with water, and the combined slurry and wash water was acidified with concentrated hydrochloric acid to pH 2.1 The flocculated slurry was stirred for one hour, after which the pigment was collected by vacuum filtration. The pigment was washed free of acid, dried in an oven at 80° C., and ground in a blender to yield 225 g of milled pigment.

The pigment could not be dispersed in water and thus was not tested for dispersibility. Test results for color properties are given in Table 2.

Comparison Example 6

The procedure of Example 1 was followed with the following exceptions: 150 g of crude perylene pigment were slurried in 500 g water containing 22.5 g of Comparison Dispersant C3 (15% active on pigment). During the milling, the slurry thickened rapidly. Approximately 1 g of AMP-95 was added to raise the pH and thin the slurry. Additional water was added during the first 45 minutes of milling such that the overall solids content of the slurry, which had thickened to the point at which it could not be milled, was approximately 22%.

This unusable slurry was discarded without further analysis.

Comparison Example 7

The procedure of Example 1 was followed with the following exceptions: 150 g of crude perylene pigment were slurried in 500 g water containing 22.5 g of Comparison Dispersant $C_4$ (15% active on pigment). During the milling, the slurry thickened rapidly. Approximately 1 g of AMP-95 was added to raise the pH and thin the slurry. Additional water was added during the first 45 minutes of milling such that the overall solids content of the slurry, which had thickened to the point at which it could not be milled, was approximately 22%.

This unusable slurry was discarded without further analysis.

TABLE 1

Dispersibility test results

| Example | Polymer Dispersant | Effective diameter (nm) | Polydispersity |
|---|---|---|---|
| 1 | 1 | 232 | 0.232 |
| 2 | 2 | 255 | 0.202 |
| 3 | 3 | 349 | 0.254 |
| 4 | 4 | 276 | 0.139 |

TABLE 2

Color property test results

| Example | Polymer Dispersant | Masstone ΔL | Masstone ΔC | Masstone Trans. | Undertone ΔL | Undertone ΔH | Undertone ΔC | Undertone % str. | Metallic ΔL | Metallic ΔH | Metallic ΔC | Metallic % str. | Flop |
|---|---|---|---|---|---|---|---|---|---|---|---|---|---|
| Comp. 2 | None | — | — | — | — | — | — | — | — | — | — | — | neut. |
| Comp. 3 | 1(10%; not milled) | −0.21 | −1.59 | 1.40 | 0.67 | 2.92 | 1.25 | 95.54 | 2.20 | 2.07 | 5.95 | 97.95 | neut. |
| Comp. 4 | 1(15%; not milled) | −0.12 | −1.15 | −0.30 | 0.59 | 2.97 | 1.46 | 91.75 | 2.31 | 2.02 | 6.00 | 95.86 | neut. |
| Comp. 5 | C2 | −1.17 | −6.16 | 1.57 | 0.80 | 2.41 | 2.68 | 100.10 | 3.28 | 2.23 | 10.64 | 103.16 | neut. |
| 1 | 1 | −1.27 | −6.80 | 3.02 | 0.56 | 3.39 | 1.96 | 96.03 | 3.78 | 2.86 | 10.42 | 100.00 | deep |
| 2 | 2 | −0.50 | −2.81 | −1.32 | 0.38 | 1.48 | 0.81 | 96.61 | 2.22 | 1.50 | 6.21 | 99.32 | deep |
| 3 | 3 | −0.24 | −1.44 | −2.78 | 0.07 | 1.13 | −0.29 | 91.16 | 1.55 | 0.94 | 3.62 | 96.75 | neut. |
| 4 | 4 | −0.90 | −4.86 | 1.70 | 0.47 | 2.57 | 1.45 | 95.58 | 3.33 | 2.36 | 9.14 | 99.46 | deep |

What is claimed is:

1. A process for preparing a dispersible organic pigment composition comprising
   (a) wet-milling a mixture comprising
      (1) one or more organic pigments,
      (2) at least about 1% by weight, relative to the organic pigment, of one or more aromatic polyalkylene oxide dispersants,
      (3) a positive amount of up to about 10 parts by weight, relative to the organic pigment, of a milling liquid in which the organic pigment is substantially insoluble,
      (4) 0 to about 50% by weight, relative to the organic pigment, of one or more milling additives other than dispersant (2), and
      (5) 0 to about 20% by weight, relative to the organic pigment, of one or more surface treatment additives;
   (b) optionally, adding to the milled pigment
      (6) one or more liquids in which the organic pigment is substantially insoluble in amounts such that the total solids content is not reduced below about 10%, and
      (7) one or more multivalent metal salts and/or one or more quaternary ammonium salt; and
   (c) isolating and drying the milled organic pigment.

2. A process according to claim 1 wherein the organic pigment is a perylene, quinacridone, phthalocyanine, 1,4-diketopyrrolopyrrole, or isoindoline.

3. A process according to claim 1 wherein the aromatic polyalkylene oxide dispersant is a compound having the formula

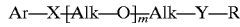

Ar—X—[Alk—O]$_m$—Alk—Y—R wherein

Ar is an aromatic hydrocarbon group or a heteroaromatic group in which one or more ring atoms are N, O, S, or a combination thereof;

Alk is $C_2$–$C_6$ alkylene;

X represents a direct bond or a —O—, —S—, —NR$_1$—, —SO2—, —CO—, —Alk$^1$—, or —Ar$^1$— bridging group or a chemically reasonable combination of one or more —O—, —S—, —NR$^1$—, —S—O$_2$—, —CO—, —Alk$^1$—, or —Ar$^1$— groups, wherein R$^1$ is hydrogen, $C_1$–$C_6$ alkyl, $C_5$–$C_7$ cycloalkyl, $C_7$–$C_{16}$ aralkyl, an aromatic hydrocarbon group, a heteroaromatic group in which one or more ring atoms are N, O, S, or a combination thereof, $C_2$–$C_8$ alkanoyl, $C_7$–$C_{16}$ aralkanoyl, $C_7$–$C_{11}$ aroyl, ($C_1$–$C_6$ alkoxy)carbonyl, ($C_7$–$C_{16}$ aralkoxy)carbonyl, ($C_6$–$C_{10}$ aryloxy)carbonyl, carbamoyl, ($C_1$–$C_6$ alkylamino)carbonyl, or ($C_6$–$C_{10}$ arylamino) carbonyl, or R$^1$ is attached to Ar though a direct bond or indirectly through one or more —SO$_2$—, —CO—, or —Alk$^1$— to form a fused-on five- or six-membered ring, Alk$^1$ is $C_1$–$C_8$ alkylene or $C_5$–$C_7$ cycloalkylene, and Ar$^1$ is $C_6$–$C_{10}$ arylene;

R is hydrogen, $C_1$–$C_{20}$ alkyl, $C_2$–$C_{20}$ alkenyl or alkadienyl, $C_5$–$C_7$ cycloalkyl, $C_5$–$C_7$ cycloalkenyl or cycloalkadienyl, $C_7$–$C_{16}$ aralkyl, an aromatic hydrocarbon group, a heteroaromatic group in which one or more ring atoms are N, O, S, or a combination thereof, $C_2$–$C_8$ alkanoyl, $C_7$–$C_{16}$ aralkanoyl, $C_7$–$C_{11}$ aroyl, ($C_1$–$C_6$ alkoxy)carbonyl, ($C_7$–$C_{16}$ aralkoxy)carbonyl, ($C_6$–$C_{10}$ aryloxy)carbonyl, carbamoyl, ($C_1$–$C_6$ alkylamino)carbonyl, ($C_6$–$C_{10}$ arylamino)carbonyl, a sulfonic acid group or a salt, ester, or amide thereof, a carboxylic acid group or a salt, ester, or amide thereof, a phosphonic acid group or a salt, ester, or amide thereof, or, if Y is a direct bond, an amino or ammonium group or a halogen atom;

Y represents a direct bond or a —O—, —S—, —NR$^2$—, —SO$_2$—, —CO—, —Alk$^2$—, or —Ar$^2$— bridging group or a chemically reasonable combination of one or more —O—, —S—, —NR$^2$—, —SO$_2$—, —CO—, —Alk$^2$—, or —Ar$^2$— groups, wherein R$^2$ is hydrogen, $C_1$–$C_6$ alkyl, $C_5$–$C_7$ cycloalkyl, $C_7$–$C_{16}$ aralkyl, an aromatic hydrocarbon group, a heteroaromatic group in which one or more ring atoms are N, O, S, or a combination thereof, $C_2$–$C_8$ alkanoyl, $C_7$–$C_{16}$ aralkanoyl, $C_7$–$C_{11}$ aroyl, ($C_1$–$C_6$ alkoxy)carbonyl, ($C_7$–$C_{16}$ aralkoxy)carbonyl, ($C_6$–$C_{10}$ aryloxy)carbonyl, carbamoyl, ($C_1$–$C_6$ alkylamino)carbonyl, or ($C_6$–$C_{10}$ arylamino) carbonyl, with the proviso that when R is alkyl, alkenyl, alkadienyl, cycloalkyl, cycloalkenyl, cycloalkadienyl, aralkyl, an aromatic hydrocarbon group, a heteroaromatic group, alkanoyl, aralkanoyl, aroyl, alkoxycarbonyl, aralkoxycarbonyl, aryloxycarbonyl, carbamoyl, alkylaminocarbonyl, or arylaminocarbonyl, then R$^2$ can also be attached to R directly though a bond or indirectly through one or more —SO$_2$—, —CO—, or —Alk$^2$— to form a five- or six-membered ring, Alk$^2$ is $C_1$–$C_8$ alkylene or $C_5$–$C_7$ cycloalkylene, and Ar$^2$ is $C_6$–$C_{10}$ arylene; and m is from about 2 to about 100.

4. A process according to claim 1 wherein the aromatic polyalkylene oxide dispersant is a compound having the formula

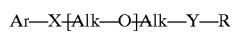

Ar—X—[Alk—O]Alk—Y—R wherein

Ar is an aromatic hydrocarbon group;

X is a direct bond, O, or —CO—NR$^1$— wherein R$^1$ is hydrogen or alkyl or is attached to the aromatic group through a —CO— group to form an imide;

Alk is ethylene, 1,2-propylene, or a combination thereof;

Y is O;

R hydrogen or $C_1$–$C_6$ alkyl; and m is from about 2 to about 100.

5. A process according to claim 1 wherein the aromatic polyalkylene oxide dispersant is a compound having the formula

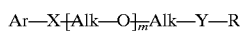

wherein

Ar is optionally ring-substituted phenyl or naphthyl;

X is a direct bond, O, or —CO—NR$^1$— wherein R$^1$ is attached to the aromatic group through a —CO— group to form an imide;

Alk is ethylene, 1,2-propylene, or a combination thereof;

Y is O;

R hydrogen or $C_1$–$C_6$ alkyl; and m is from about 2 to about 100.

6. A process according to claim 1 wherein the milled organic pigment is isolated by spray drying or lyophilization.

7. A dispersible pigment composition prepared according to the process of claim 1.

8. A pigmented coating composition containing a dispersible pigment composition prepared according to claim 1.

9. An aqueous pigment dispersion comprising a dispersible organic pigment composition, prepared by the process according to claim 1, in an aqueous liquid medium.

10. A coating composition comprising a pigment dispersion according to claim 9 and an aqueous liquid medium.

* * * * *